Patented Dec. 13, 1938

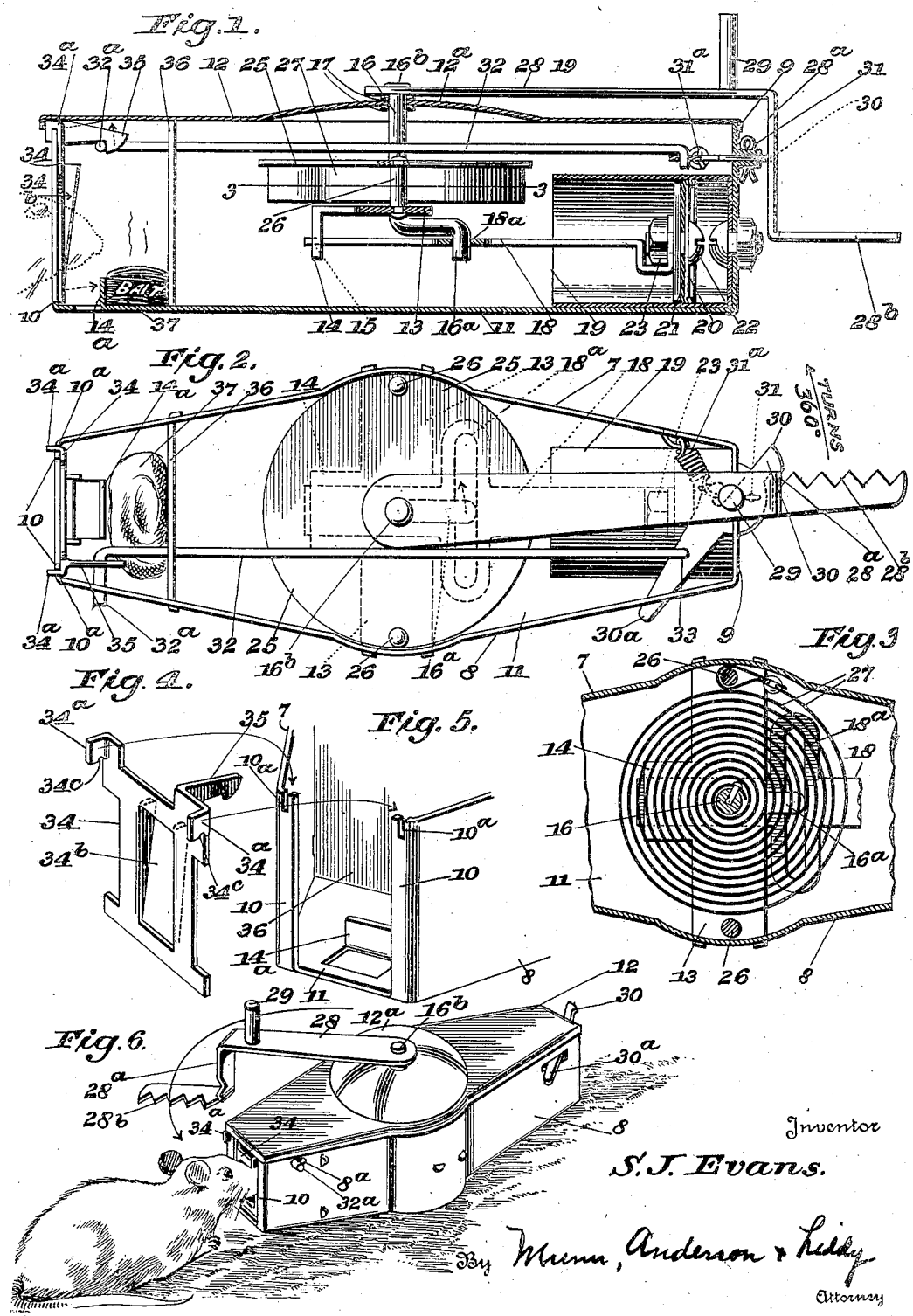

2,139,674

UNITED STATES PATENT OFFICE 2,139,674

AUTOMATIC RESETTING TRAP

Samuel J. Evans, Princeton, W. Va.

Application January 4, 1936, Serial No. 57,597
Renewed March 9, 1938

1 Claim. (Cl. 43—75)

My invention relates to animal traps of the resetting type, and it consists in the combinations, constructions and arrangements herein described and claimed.

An object of my invention is to provide an animal trap that will kill an animal such as a rat by striking it, knocking it away from the trap, and then resetting itself automatically.

A further object of the invention is to provide a device of the type described which can be wound up like a clock and which when so wound will operate for a number of times without any further attention.

A further object of the invention is to provide a device in which the force of a released arm is used to kill the animal and to knock it aside after which the motion of the arm in returning to its initial position is retarded, thus preventing undue jar and injuring of the mechanism.

A still further object is to provide a device of the type described which is comparatively simple but which is durable and easily manipulated.

Other objects and advantages will apear in the following specification and the novel features of the invention will be particularly pointed out in the appended claim.

My invention is illustrated in the accompanying drawing forming part of this application, in which:

Figure 1 is a longitudinal section through the housing, certain parts being shown in side elevation, Figure 2 is a plan view of the device with the top removed, Figure 3 is a section substantially along the line 3—3 of Figure 1, Figure 4 is a detail perspective view of a movable frame and the pivoted catch carried thereby, Figure 5 is a perspective view of one end of the device showing the means for mounting the frame and the catch of Figure 4, and Figure 6 is a perspective view of the device in operation.

In carrying out my invention I provide a housing, preferably elongated as shown in the drawing, consisting of side walls 7 and 8, end walls 9 and 10, a bottom 11, and a top 12.

Carried within the housing is a transverse plate 13 having a laterally extending flange 14 provided with a guide opening 15, the purpose of which will be explained later. The top 12 is preferably bowed, as shown at 12a, to provide a bearing support for a vertically disposed crank shaft 16.

Bearings 17 are provided for one end of the crank shaft, the lower portion of the crank shaft being journaled in the support 13. The offset portion 16a of the crank shaft 16 is disposed in a slot 18a of a flat bar 18, one end of which extends through the slot 15 in the flange 14, the other end extending into a cylinder 19 and having a U-shaped bend adjacent a piston 20 which is provided with a flexible diaphragm or sucker 21 which is clamped into position by the plates forming the piston by means of the bolt 22 and nut 23. There is a space around the piston to permit the air to enter the cylinder behind the piston as the latter moves toward the left in Figure 1 which space is partially closed by the flexible diaphragm in the movement of the piston toward the right to permit the air to pass out slowly, thus giving a dashpot effect.

A circular plate 25 is secured to the support 13 by means of pins 26, the shaft 16 passing through an opening in this plate. Between the plate 25 and the support 13 is a coil spring 27, one end of which is attached to one of the pins 26 (see Fig. 3) and the other end being attached to the shaft 16.

An arm 28 is secured to the protruding end of the shaft 16 at 16b. This arm extends over the end of the housing and then is bent laterally, as shown at 28a, and terminates in a toothed portion 28b. It is provided with a handle 29.

A detent 30 is pivotally mounted at 31 at one end of the housing. This detent has a fingerpiece which projects through the side wall of the housing, as shown at 30a and a spiral spring 31a is connected with the detent at one end and with the interior wall of the housing at the other so as to normally throw the detent in an outer position to engage the portion 28a of the arm 28 and hold the arm against the tension of the spring 27. A rod 32 is pivotally connected with the detent at 33, the opposite end of the rod 32 being bent at right angles as shown at 32a and extends through an opening 8a in the side wall 8 of the housing.

The upper portion of the walls 9 and 10 (see Fig. 5) are provided with grooves 10a to receive the flanges 34a of a rectangular frame 34, notches 34c being provided to pivotally suspend the frame in the grooves 10a. The frame 34 has a laterally extending portion 35 which forms a catch arranged to engage the bent end 32a of the rod 32. The bottom 14 has a struck-up portion 14a to provide a bait chamber between said struck-up portion and a partition 36 extending across the interior of the housing as shown in Fig. 1 and 2.

From the foregoing description of the various parts of the device the operation thereof may be readily understood. To wind up the spring the trap is held in the palm of the hand and the right end of the trap, as shown in the drawing, is tilted slightly downwardly. This releases the catch 35 from the portion 32ª of the rod 32. The finger-piece 30ª is then pushed forwardly (to the right in Fig. 2) and the arm 28 may then be turned by means of the handle 29 clockwise until the spring 27 is wound up. When the trap is slightly inclined in the opposite direction the catch 35 will engage the rod 32 and this will maintain the detent 35 so as to hold the arm 28 against the tension of the spring.

The bait 37 having been placed in position the trap is left in a place where an animal, such as a rat, is likely to frequent. The animal in trying to get the bait in the receptacle forces its snout in the opening 34ᵇ of the frame 34. This frame is very easily moved because it is virtually pivoted on a knife edge so that the catch 35 is raised by the movement. The spring 27 being considerably stronger than the spring 31 urges the arm 28 against the detent 30 and pushes it aside. The arm now being free is rotated rapidly through 180° and strikes the animal on the side of the head, killing it, and knocking it out of the way. In order to insure the death of the animal I have provided the teeth which tend to penetrate the head of the animal but are so fashioned as not to impale it on the teeth.

The crank shaft 16 in its movement will draw the bar 18 and the piston toward the left in Figure 1. Since the air can readily pass through the piston it will not retard the movement of the arm but when the arm passes 180° then the piston 20 will be on its return movement and will be retarded, thus retarding the movement of the arm 28 so that in the next 180° of its movement the arm will come relatively slowly back.

When the animal is thrown by the arm free of the swinging frame 34, the catch 35 will return to its normal position, thus holding the rod 32 which, in turn, maintains the detent 30 in an outer position to stop the arm 28, where it is again held in a set position, still subject to the tension of the spring 27 until such time as the latter has lost its force, when it may be rewound in the manner stated.

I claim:

An automatic resetting trap comprising an elongated housing having a bait opening at one end, a pivoted frame having an opening normally registering with said bait opening, a catch connected with said frame, a centrally disposed vertical shaft carried by the housing and arranged to extend exteriorly thereof, a horizontal arm secured to the shaft, said arm extending over the end of the housing and being provided with a downwardly extending portion spaced from the wall of the housing and adapted to pass the bait opening, a spring controlled detent projecting from the housing and arranged to engage the downwardly extending portion of the arm, a spiral spring disposed within the housing for exerting tension on the shaft, and a connection between said spring-actuated detent and the catch at the opposite end for normally maintaining the detent in its arm-holding position, the actuation of the pivoted frame and the catch serving to move the detent to release the arm.

SAMUEL J. EVANS.